Jan. 30, 1962 M. A. POWERS 3,018,845
FILTERS
Filed Dec. 12, 1957
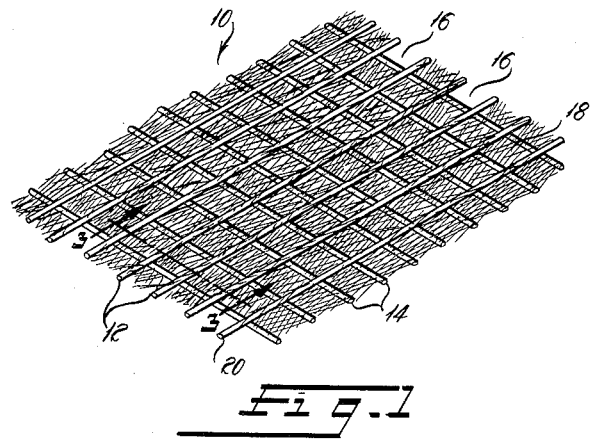
Fig.1
Fig.2
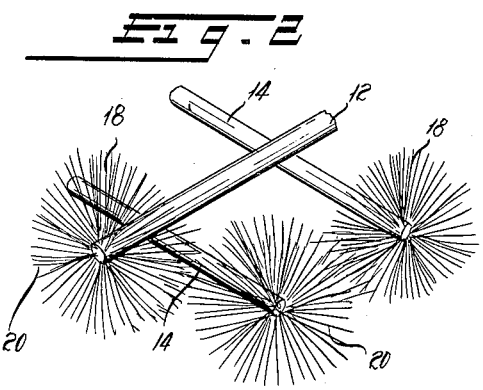
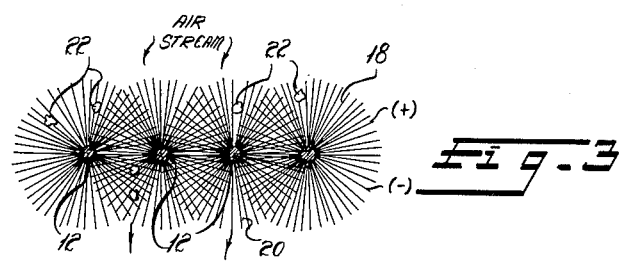
Fig.3
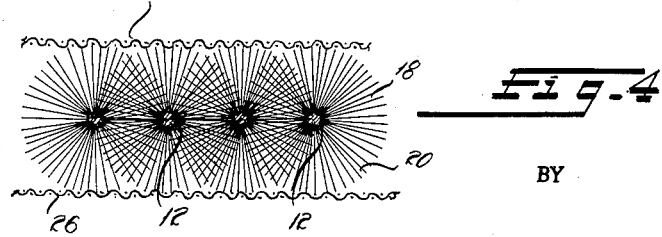
Fig.4
INVENTOR
MILTON A. POWERS
BY Strauch, Nolan + Neale
ATTORNEYS

United States Patent Office 3,018,845
Patented Jan. 30, 1962

3,018,845
FILTERS
Milton A. Powers, 655 Bedford, Grosse Pointe 30, Mich.
Filed Dec. 12, 1957, Ser. No. 702,306
4 Claims. (Cl. 183—7)

This invention relates to improved fluid filter mediums and a novel method for filtering foreign particles such as dust from gaseous fluids, and more particularly to filter mediums of the type comprising a screen having a fibrous flock material adhesively secured thereto. The filter mediums of this invention and method and especially suited for filtering from air streams extremely small particles that are either electrostatically charged, or are capable of picking up an electrostatic charge.

Filter mediums of the type comprising a screen having relatively long resilient fibers of flock material securely and uniformly closely attached endwise on the screen have proved to be extremely effective in their filtering action. Such a filtering medium is described and claimed in co-pending U.S. application Serial No. 701,578 filed December 9, 1957 and entitled Flocked Screen and Method of Making the Same.

Filter mediums of the above-identified type have a substantial depth or thickness as compared with conventional filter mediums of the type wherein the fibers are coated or matted on the screen in a random or scattered manner with most of the fibers lying flat against the screen surface. Through endwise attachment of relatively long fibers on a supporting base screen, the resulting overlapping of the fibers that occurs provides tortuous fluid paths through all portions of the filtering medium with the paths adjacent the opposite sides of the medium being of greater size and progressively narrowing toward the center thereof. With this construction, large particles are retained at the outer surfaces while progressively smaller particles are retained as the passageways become smaller toward the center of the filtering medium. While such filter mediums have a greatly increased capacity and effective filtering action over any conventional filters using randomly-attached and matted fibers, it is possible that some extremely small-sized particles may escape being trapped and find their way into the filtered air stream.

This invention solves the above difficulty by providing a positive electrostatic charge on one side of the filter medium and a negative electrostatic charge on the opposite side which in effect serve as two filters. While this invention is particularly applicable to filters of the above-described type in co-pending U.S. application Serial No. 701,578, it is to be understood that it may be used to great advantage on any type of filtering medium capable of holding different electrostatic charges on opposite sides thereof or separate filtering mediums used in series with a different electrostatic charge on each.

An object of this invention is to provide an improved fluid filtering medium assembly comprising a series of electrostatically charged filters having opposite charges thereon whereby electrostatically charged particles being filtered that are not retained by one filter having a like charge are retained by another having an opposite charge.

Another object of this invention is to provide a novel gas filtering medium comprising a meshed screen having electrostatically charged fibrous flock material secured to opposite sides of the screen, the electrostatic charge on the fibers on one side of the screen being opposite from the electrostatic charge on the fibers on the other side of the screen.

A further object of this invention is to provide a novel method for filtering gaseous fluids wherein the fluid is passed through a series of electrostatically charged filters having opposite charges thereon whereby charged particles being filtered that are not retained by one filter having a like charge are retained by another having an opposite charge.

Other objects and advantages of the invention will become apparent from the following detailed description and drawing, in which:

FIGURE 1 is a perspective view of a preferred embodiment of the filtering medium of this invention;

FIGURE 2 is an enlarged perspective view of a section of the filtering medium of FIGURE 1 showing individual fibers attached only on small end portions of a screen for purposes of clarity;

FIGURE 3 is a view taken along the line 3—3 of FIGURE 1; and

FIGURE 4 is a transverse sectional view of a filtering medium illustrating another embodiment of the invention.

Referring now more specifically to the drawing, there is shown a preferred embodiment of this invention comprising a screen indicated generally at 10 having cross-laid rust-proof heavy gauge metal wires 12 and 14 intersecting at right angles to provide mesh openings 16. A multiplicity of fibers 18 of a glass flock material which inherently carry a positive electrostatic charge are attached endwise and substantially at right angles to one side of the wires 12 and 14 by a suitable adhesive (not shown). A multiplicity of fibers 20 of a polystyrene flock material which inherently carry a negative electrostatic charge are attached endwise in a like manner to the opposite side of the wires 12 and 14. These positive and negative electrostatic charges on the fibers on opposite sides of the screen in effect provide a series of two filtering mediums as will be apparent hereinafter.

As illustrated more clearly in FIGURES 2 and 3, the lengths of fibers 18 and 20 are about equal to the length and width of square openings 16 which in this embodiment are about ½ inch, but screens with from two to eight meshes per inch and larger have been used with good results. The length of the fibers of the flock material used of course depends upon the size of the mesh openings in the screen to which it will be applied and in general the minimum length of the fibers is at least ½ the maximum dimension of the mesh openings with the maximum dimension being about 1½ times as large as the maximum dimension of the mesh openings. At these lengths, a tortuous fluid path is provided through all portions of the filtering medium.

As the length of the fibers is increased, substantial overlapping thereof occurs adjoining the mesh openings and outwardly therefrom to provide uniformly narrowing tortuous fluid paths which act as a mechanical trap for particles such as indicated at 22 in FIGURE 3. Disregarding for the moment the electrostatic attraction that occurs between the particles 22 and fibers 18 or 20, it is readily apparent from FIGURE 3 that in an air stream passing through the filter from one side to the other as indicated, that mechanical trapping of particles 22 is more effective on the incoming side of the filter where the fluid passageways therethrough are converging in size toward the points of attachment of fibers 18 to the wires 12 and 14 of screen 10. Should the particles 22 be so small as to escape mechanical entrapment on the incoming side and pass the screen 10, there is small chance that they will be retained on the outgoing side as the fibers 20 forming the fluid passageways tend to be in diverging relation from points of attachment to the screen and thus the particles which have escaped being trapped now slide along the fibers 20 and soon are once again in the supposedly cleaned air stream.

In this invention, the possibilities of particles 22 escaping through the filter medium are eliminated by having opposite electrostatic charges on the fibers 18 and 20, respectively. Assuming that the particles 22 in the air stream as they approach the filtering medium have no electrostatic charge thereon, and disregarding the mechanical trapping that occurs, the particles will be mildly attracted to electrostatically charged fibers 18. As the particles come in contact and slide along fibers 18, they tend to become charged with a like charge as that on the fibers, which in the embodiment illustrated is positive, and later if such a particle should escape and pass through the screen 10 to the area of fibers 20 carrying a negative charge, it will have a greatly increased force pulling it toward and thereafter holding it to the adjacent fibers 20 on the outgoing side of the filter medium.

From the foregoing, it is quite obvious that a dust particle already carrying an electrostatic charge will cling most tenaciously to the fibers bearing an opposite charge. Such particles may escape mechanical entrapment and pass through the fibers having the same charge as they would tend to be repelled by the like charge; however, they will cling to the fibers bearing an opposite electrostatic charge, whether they be on the incoming or outgoing side of the filtering medium. Thus, a major disadvantage of electrostatically charged filters bearing a single charge, which tends to repel rather than attract particles carrying a like charge allowing them to pass through the filter medium unhindered, is eliminated.

Referring now to FIGURE 4, there is shown another embodiment of this invention wherein the filter medium described in connection with FIGURES 1 through 3 has disposed on opposite sides thereof a woven cloth or screen 24 and 26 which is of glass and polystyrene respectively, carrying opposite electrostatic charges corresponding to the opposite electrostatic charges on fibers 18 and 20 respectively. The screens 24 and 26 may be of other suitable materials as will be set forth hereinafter, and if desired be in multiple layers. Also, it is contemplated that the fibrous flock filter medium sandwiched between the opposite electrostatically charged screens 24 and 26 may be substituted for by other types of filtering mediums, or suitable separating members or eliminated altogether and still achieve an improved filtering action over conventional filtering mediums.

In preferred embodiments of this invention, the fibers of flock material are attached endwise to the screen as described hereinabove in order that the filtering medium provide a mechanical trapping of particles in addition to the electrostatic filtering action that results from the fibers having opposite electrostatic charges on opposite sides of the screen. However, it should be understood that screens having fibers randomly attached on opposite sides thereof as is well known in the art, separate screens having oppositely charged electrostatic flock material secured thereto, supporting means other than a screen for the flock material, or filtering mediums other than fibrous flock material may employ the novel concept of oppositely charged electrostatic filtering. The means forming the filtering mediums may naturally or inherently carry the desired electrostatic charge or the electrostatic charge may be artificially induced and maintained as by an electrostatic generator.

It is preferred that the respective flocking materials used inherently carry either a positive or negative electrostatic charge or have natural charges as dissimilar as possible. However, practical considerations for the particular application or service in which the filter medium of this invention will be used may be a determining factor in the selection of materials such as cost, form, rigidity or stiffness, flammability, ease of application, etc. Where such a factor is controlling, the strength of charge may be less widely separated and good results still be achieved, although the principle of the invention remains the same.

The following Table I is illustrative of materials bearing opposite charges and their relative degrees of charge in relation to those listed. While experimental data to date shows the materials to follow the order substantially as listed, results are not yet conclusive as to their actual rating. There are of course maybe other materials which may inherently carry a greater charge than those listed, or be capable of more readily carrying an artificially induced charge.

*Table I*

| Glass—Greater positive charge. Nylon Yarn. Nylon Monofilament. Wool. Silk. Viscose Rayon—Still positive. Cotton—About neutral. Paper—About neutral. | Hard Rubber—Slight negative charge. Acetate Rayon. Synthetic Rubber. Orlon. Saran. Polyethylene. Polystyrene—Greater negative charge. |
|---|---|

The method in which the flocking material is used may have an effect on the charge that it carries. For example, the same flocking material may be applied to both sides of a screen, and then on one side of the screen dip or spray coat the fibers with a dilute solution of a suitable plastic having a greater opposite charge than that which the fibers are carrying. The surfaces of these fibers would then exhibit the charge of the plastic coating rather than the charge of the original fiber underneath. Not only is there provided a desired opposite charge on the opposite side of the screen, but the plastic coating also serves to reinforce and strengthen the fibers and more important they are firmly attached to neighboring fibers at points where they lie across or are in contact with one another.

Washing filter mediums made from such flock materials as those listed in Table I, with the exception of course of some papers that are not waterproof, has no ill effect on the inherent type of electrostatic charge on the individual fibers and they continue their effective electrostatic filtering action throughout the life of the filtering medium.

Endwise attachment of the fibers of flock material in the preferred embodiments of this invention is accomplished by the electrostatic charge thereon as they are blown by a circulating air stream against the screen. The fibers are preferably stiff enough to be self-supporting. The screen is either grounded or supplied with an electrostatic charge opposite to the electrostatic charge on said fibers so that as the fibers approach the screen, they will so position themselves by the attractive force between the screen and fibers that they impinge upon the adhesive in an endwise manner whereby their ends are partially embedded in the wet adhesive film on the screen. Because the fibers applied on one side of the screen all have like electrostatic charges thereon, they are repelled by each other and as they approach the screen move as far away as possible from the fibers already attached thereto so that each individual fiber will seek the largest available space on the adhesive-coated screen and all fibers will tend to be substantially uniformly spaced from each other. After the desired amount of fibers have been attached to one side of the screen, the opposite side of the screen is flocked in a like manner with oppositely charged fibers and the wet adhesive is then baked, dried or cured in any suitable manner.

An additional electrostatic charge may be applied to the fibers before they are attached to the screen by passing them through an electric field created by any suitable means such as a Van de Graaf electrostatic generator.

Endwise attachment of long fibrous flock material to a screen in the above manner is described and claimed in the co-pending application Serial No. 701,578, filed December 9, 1957, and entitled Flocked Screen and Method of Making the Same referred to hereinbefore.

The adhesive used in this invention may be any of those which can be readily applied to the screen, preferably in a liquid state, so that conventional application by spraying, dipping, brushing or rolling is facilitated.

The wet surface of the adhesive should be such that the fibers upon contact therewith may readily embed themselves therein so that the fibers are tightly secured when the adhesive is cured. Examples of suitable adhesives are paints, such as used on farm machinery, synthetic resins and plastics, varnishes, rubber-based adhesives and the like. The choice of adhesives in many cases will depend upon the service conditions to which the filter will be subjected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A filtering assembly comprising a grid-like support, means adhesively supporting a first filter of flocking material of individual positively electrostatically charged fibers upon and substantially entirely over one side of said support and a second filter of flocking material of individual negatively electrostatically charged fibers adhesively secured upon and substantially entirely over the other side of said support.

2. A filtering assembly comprising a screen having meshes therein and different electrically insulating flocking materials of individual fibers adhesively endwise secured to opposite sides of the screen, the fibers on one side of the screen having a positive electrostatic charge and the fibers on the opposite side of the screen having a negative electrostatic charge.

3. A filtering assembly comprising a screen having meshes therein and electrically insulating flocking material of resilient individual fibers adhesively secured endwise on opposite sides of said screen, said fibers having a length of at least one half the largest dimension of the meshes in the screen, said fibers on opposite sides of the screen being of different material and each having an electrostatic charge thereon, the fibers on one side of the screen having an electrostatic charge opposite from the electrostatic charge on the fibers on the other side of the screen.

4. The filtering medium of claim 3 wherein said flocking material is a synthetic plastic, the fibers on one side of the screen being of a different plastic than the fibers on the opposite side of the screen.

References Cited in the file of this patent

UNITED STATES PATENTS

| | | |
|---|---|---|
| 2,282,770 | Sarver | May 12, 1942 |
| 2,297,601 | Williams | Sept. 29, 1942 |
| 2,463,722 | Spraragen | Mar. 8, 1949 |
| 2,522,568 | Dahlman | Sept. 19, 1950 |
| 2,740,184 | Thomas | Apr. 3, 1956 |
| 2,782,933 | Monsarrat | Feb. 26, 1957 |
| 2,804,937 | Poole | Sept. 3, 1957 |
| 2,822,059 | Lunn et al. | Feb. 4, 1958 |

FOREIGN PATENTS

| | | |
|---|---|---|
| 109,892 | Switzerland | May 16, 1925 |
| 50,767 | Denmark | Oct. 14, 1935 |
| 892,334 | France | Jan. 7, 1944 |
| 780,709 | Great Britain | Aug. 7, 1957 |